US008061507B2

(12) United States Patent
Menozzi et al.

(10) Patent No.: US 8,061,507 B2
(45) Date of Patent: Nov. 22, 2011

(54) SEQUENCING UNIT FOR OPENING DEVICES FOR GLUING TO SEALED PACKAGES OF POURABLE FOOD PRODUCTS

(75) Inventors: Stefano Menozzi, Parma (IT); Alessandro Morselli, Piumazzo (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 390 days.

(21) Appl. No.: 12/083,636

(22) PCT Filed: Dec. 27, 2006

(86) PCT No.: PCT/EP2006/070231
§ 371 (c)(1), (2), (4) Date: Apr. 16, 2008

(87) PCT Pub. No.: WO2007/074161
PCT Pub. Date: Jul. 5, 2007

(65) Prior Publication Data

US 2008/0307749 A1 Dec. 18, 2008

(30) Foreign Application Priority Data

Dec. 29, 2005 (EP) .................................... 05425935

(51) Int. Cl.
*B65G 47/00* (2006.01)

(52) U.S. Cl. ............. 198/468.11; 198/459.1; 198/459.6; 198/626.1

(58) Field of Classification Search ............... 198/459.1, 198/459.6, 459.7, 469.1, 479.1, 620, 626.1, 198/443, 453, 454, 459.8, 434, 460.1, 460.3, 198/459.5, 725, 728, 468.11
See application file for complete search history.

(56) References Cited

U.S. PATENT DOCUMENTS

| | | | | |
|---|---|---|---|---|
| 1,508,369 | A * | 9/1924 | Johnson | 198/463.6 |
| 1,543,844 | A * | 6/1925 | Gwinn | 198/459.5 |
| 1,676,978 | A * | 7/1928 | Bohn | 198/463.4 |
| 1,778,742 | A * | 10/1930 | Williams | 198/395 |
| 2,350,479 | A * | 6/1944 | Stewart | 198/459.6 |
| 2,631,642 | A * | 3/1953 | Richardson et al. | 156/69 |
| 2,943,724 | A * | 7/1960 | McCoy | 198/459.6 |
| 3,074,533 | A * | 1/1963 | Ninnemann et al. | 198/459.8 |
| 3,231,063 | A * | 1/1966 | Talbot | 198/459.6 |

(Continued)

FOREIGN PATENT DOCUMENTS

EP 0 331 798 A2 9/1989

(Continued)

*Primary Examiner* — Gene Crawford
*Assistant Examiner* — William R Harp
(74) *Attorney, Agent, or Firm* — Buchanan Ingersoll & Rooney PC

(57) ABSTRACT

A sequencing unit operating along a feed path of a number of opening devices for attachment to respective sealed packages of pourable food products includes a conveyor for conveying the opening devices arranged in at least one line, and a releasable stop mechanism interacting with the opening devices downstream from the conveyor along the path. The stop mechanisms are normally set to a first configuration, in which they arrest the opening devices along the path, and are movable into a second configuration allowing travel of the opening devices. The unit also has a push mechanism traveling at predetermined intervals past the stop mechanism to move the stop mechanism from the first configuration to the second configuration, so that the opening devices are fed in sequence and at a predetermined rate through the stop mechanism.

20 Claims, 3 Drawing Sheets

U.S. PATENT DOCUMENTS

| | | | | | |
|---|---|---|---|---|---|
| 3,462,823 | A | * | 8/1969 | Heisler | 29/717 |
| 4,793,461 | A | * | 12/1988 | Leonard | 198/341.02 |
| 5,219,320 | A | | 6/1993 | Abrams et al. | |
| 5,267,672 | A | * | 12/1993 | Jacobsen et al. | 222/159 |
| 5,368,151 | A | * | 11/1994 | Klenk | 198/426 |
| 6,145,275 | A | | 11/2000 | Sweeney | |

FOREIGN PATENT DOCUMENTS

| | | | |
|---|---|---|---|
| EP | 0 943 549 | A1 | 9/1999 |
| EP | 1 227 041 | A2 | 7/2002 |

* cited by examiner

SEQUENCING UNIT FOR OPENING DEVICES FOR GLUING TO SEALED PACKAGES OF POURABLE FOOD PRODUCTS

TECHNICAL FIELD

The present invention relates to a sequencing unit for opening devices for gluing to sealed packages of pourable food products.

BACKGROUND ART

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as TETRA BRIK ASEPTIC (registered trademark), which is made by folding and sealing laminated strip packaging material. The packaging material has a multilayer structure comprising a base layer for stiffness and strength, which may comprise a layer of fibrous material, e.g. paper, or mineral-filled polypropylene material, and which is covered on both sides with layers of thermoplastic material, e.g. polyethylene film. In the case of aseptic packages for long-storage products, such as UHT milk, the packaging material comprises a layer of oxygen-barrier material, e.g. aluminium foil, which is superimposed on a layer of thermoplastic material, and is in turn covered with another layer of thermoplastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called “gable-top” package known by the trade name TETRA REX (registered trademark).

Once formed, the above packages may undergo further processing, such as the application of a reclosable opening devices to protect the food product inside the package from contact with external agents, and to enable the product to be poured out.

At present, the most commonly marketed opening devices comprise an annular frame portion defining a pour opening and fitted about a removable or pierceable portion of a top wall of the package; and a cap hinged or screwed to the frame portion, and which is removable to open the package. Alternatively, other types of opening, e.g. slide-open, devices are also known to be used.

The removable portion of the package may be defined by a sealing sheet glued or heat-sealed to the outside of the package to close a through hole in the package. One example of this solution is described and illustrated in Patent Application EP-A-943549. Alternatively, the removable portion of the package may be defined by a so-called “prelaminated” hole, i.e. a hole formed in the base layer of the packaging material before covering the base layer with other layers defining the packaging material, e.g. the layers of thermoplastic material and/or the layer of barrier material, which close the hole hermetically. One example of this solution is described and illustrated in Patent Application EP-A-331798.

In both cases, the opening devices are fed from a hopper to an adhesive application unit and subsequently to a gluing unit for gluing each opening device to a respective package.

To improve operation of the gluing unit, a need is felt within the industry for a sequencing unit for feeding the opening devices to the gluing unit in sequence and at predetermined travelling speeds and feed rates.

More specifically, a need is felt within the industry for highly flexible sequencing units, i.e. designed to convey the opening devices at different feed rates.

A need is also felt within the industry to reduce the operating noise level of the sequencing unit and at the same time reduce wear of the mechanical components, and so extend the working life, of the sequencing unit.

Finally, a need is also felt within the industry to cut off supply of the opening devices to the gluing unit without stopping the sequencing unit, in the event supply of the respective packages to the gluing unit is temporarily cut off.

DISCLOSURE OF INVENTION

It is an object of the present invention to provide a sequencing unit for opening devices for gluing to sealed packages of pourable products, designed to meet the above requirements in a straightforward, low-cost manner.

According to the present invention, there is provided a sequencing unit operating along a feed path of a number of opening devices for attachment to respective sealed packages of pourable food products, and characterized by comprising:

- conveying means for conveying said opening devices arranged in at least one line;
- releasable stop means interacting with said opening devices downstream from said conveying means along said path; said stop means normally being set to a first configuration, in which they arrest said opening devices along said path, and being movable into a second configuration allowing travel of said opening devices; and
- push means travelling at predetermined intervals past said stop means to move said stop means from said first configuration to said second configuration, so that said opening devices are fed in sequence and at a predetermined rate through the stop means.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

With reference to FIGS. 1 to 4, number 1 indicates as a whole a sequencing unit for opening devices 3, which may be incorporated in a known pourable food product packaging machine (not shown) of the type described in the introduction.

More specifically, unit 1 operates along a feed path A of opening devices 3. Path A is traveled by each opening device 3 in the direction indicated in FIGS. 2 to 4, and extends from a hopper (not shown), located upstream from unit 1 along path A, to a number of units (not shown), which form part of the packaging machine, interact with opening devices 3, and are located downstream from unit 1 along path A, such as a unit for depositing adhesive on opening devices 3, and a unit for gluing each opening device 3 to a respective package (not shown).

Non-limiting examples of the packages produced on packaging machines of the above type are the parallelepiped-shaped packages known by the trade name TETRA ERIK ASEPTIC (registered trademark) or so-called "gable-top" packages known by the trade name TETRA REX (registered trademark).

The packaging material of the packages has a multilayer structure (not shown) comprising a base layer of fibrous material, e.g. paper, or mineral-filled polypropylene, covered on both sides with layers of thermoplastic material, e.g. polyethylene film. In the case of aseptic packages for long-storage products, such as UHT milk, the packaging material comprises a layer of oxygen-barrier material, e.g. aluminium foil, which is superimposed on a layer of thermoplastic material, and is in turn covered with another layer of thermoplastic material forming the inner face of the package eventually contacting the food product.

Opening device 3 is applied to a removable portion of a respective package (not shown), i.e. a portion that can be detached from the rest of the package to enable the pourable product to be poured out.

The removable portion may be defined by a sealing sheet glued or heat-sealed to the package to close a through hole in the package. Alternatively, the removable portion may be defined by a so-called "prelaminated" hole, i.e. a hole formed in the base layer of the packaging material and closed hermetically by other layers defining the packaging material (at least the layers of thermoplastic material).

Figure 1:
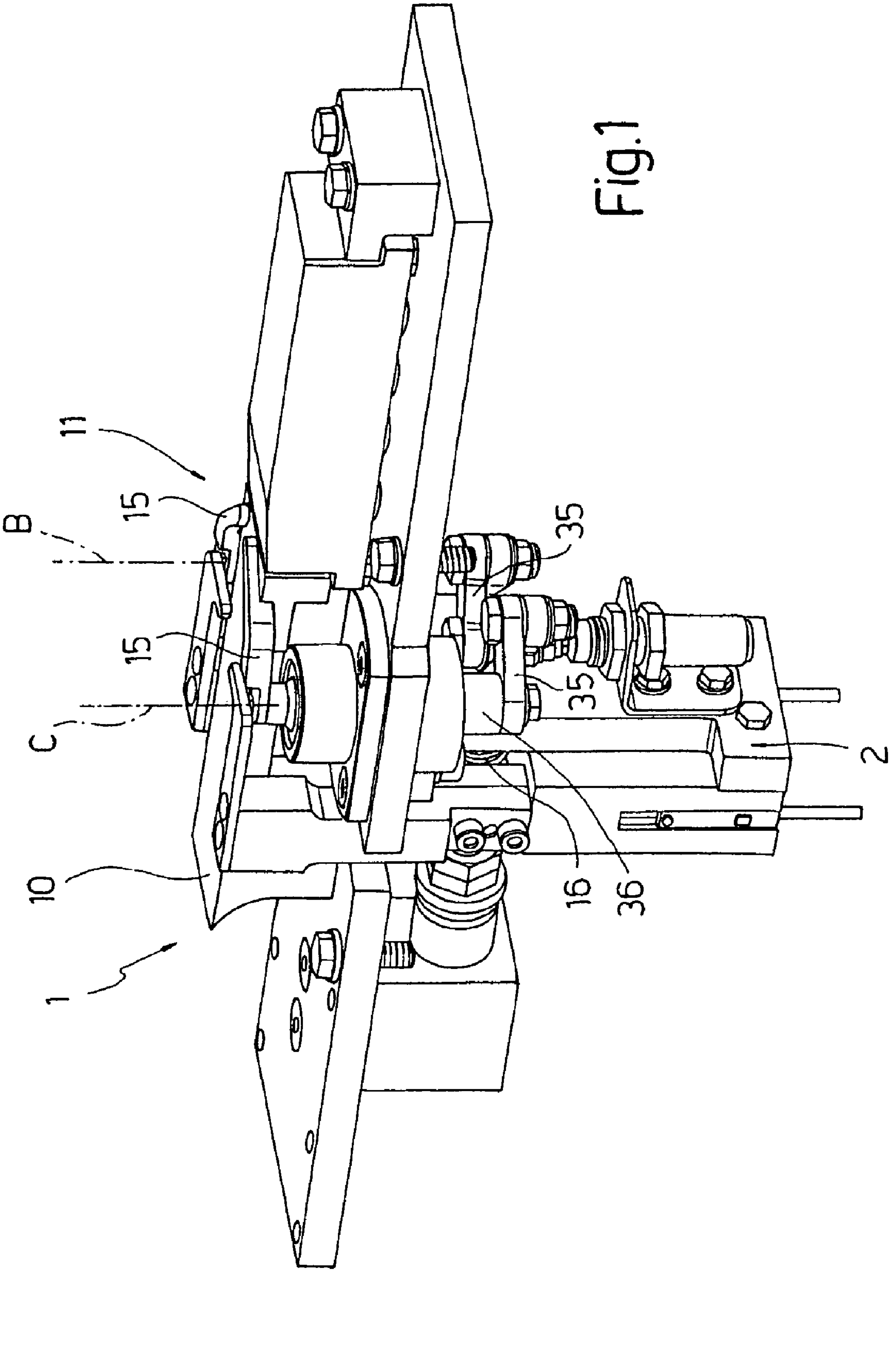
FIG. 1 shows a view in perspective, with parts removed for clarity, of a sequencing unit for opening devices in accordance with the invention.
Figure 2:
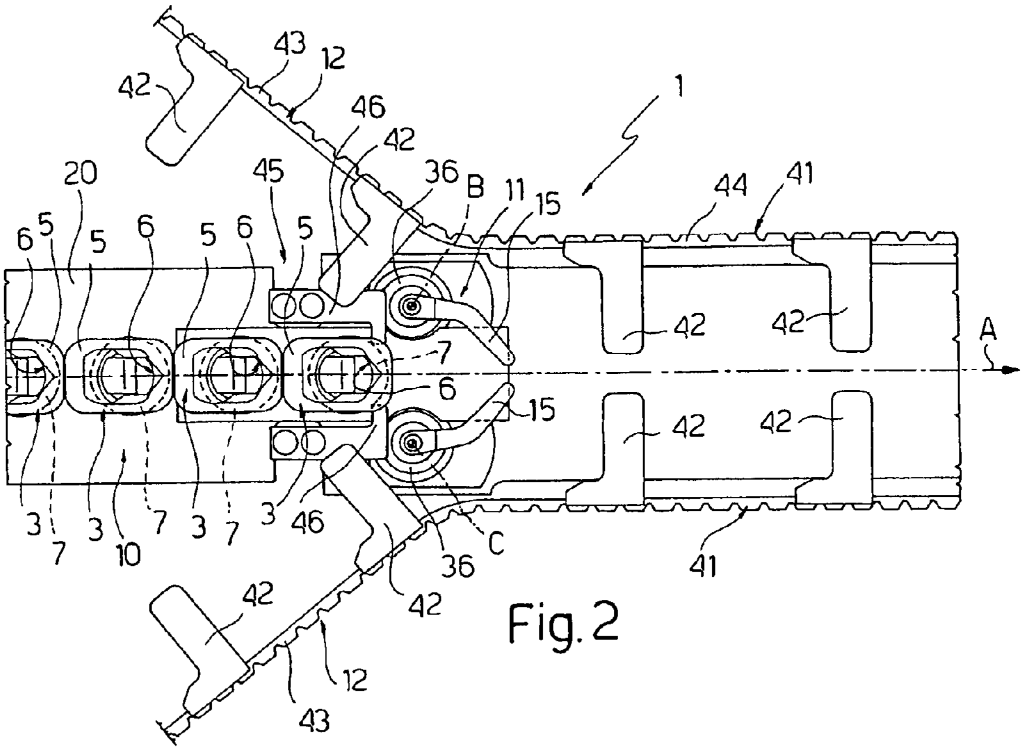
FIGS. 2 to 4 show larger-scale, top plan views of details of the FIG. 1 sequencing unit in different operating positions.
Figure 3:
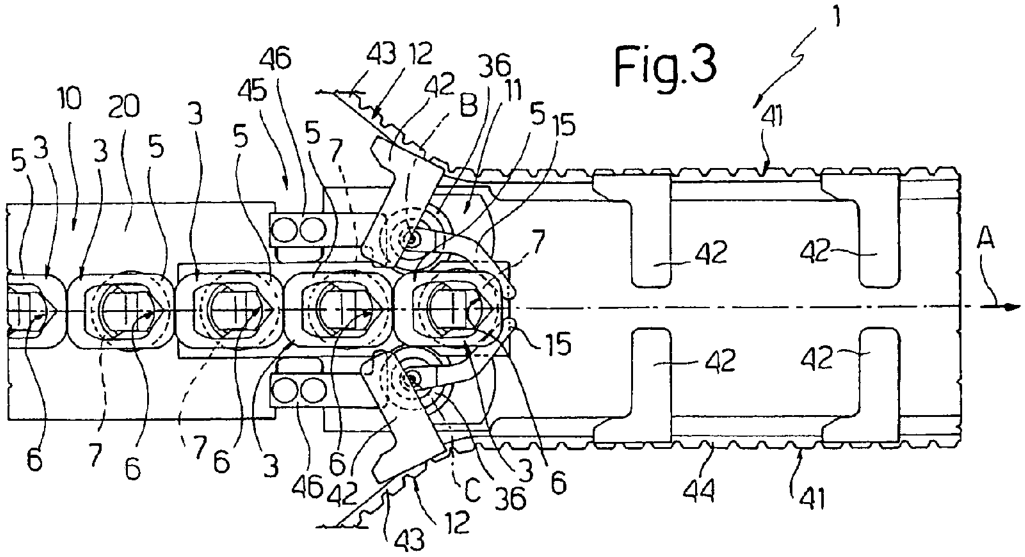
Figure 4:
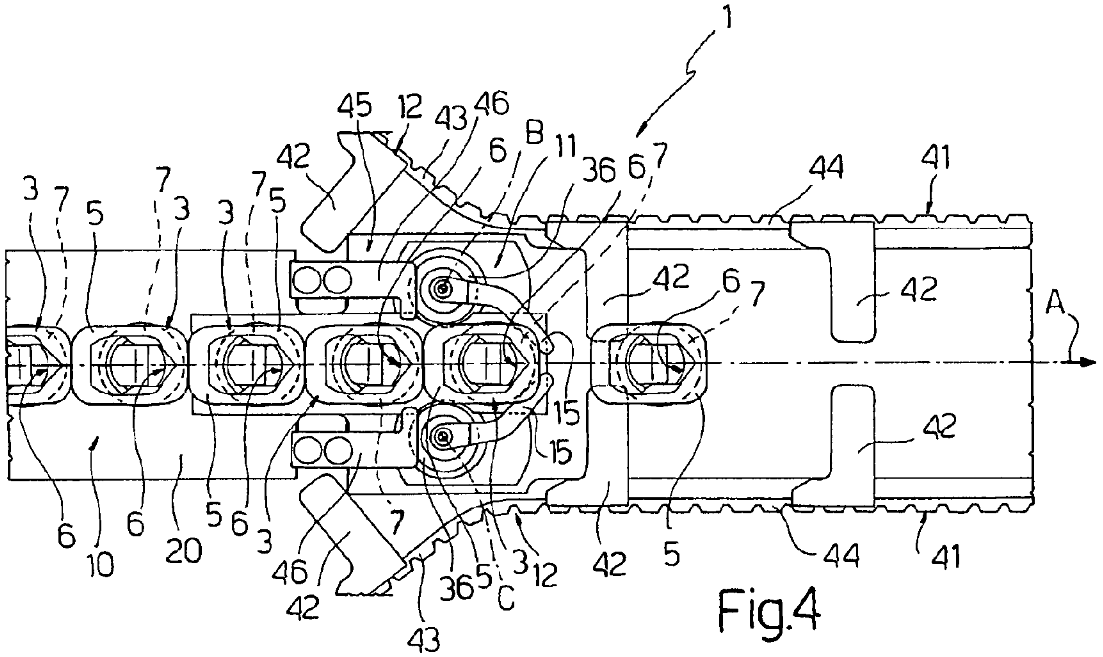

As shown in FIGS. 2 to 4, device 3 substantially comprises a frame portion 5, which is glued to a wall of a respective package so that a circular pour opening 6 is located at the removable portion; and a cap 7, which is screwed to frame portion 5 to close opening 6, and is removable from frame portion 5 to pour out the food product.

Unit 1 advantageously comprises a first conveyor 10 (conveying means) for conveying opening devices 3 arranged in a line; a releasable stop unit 11 (stop means), which interacts with opening devices 3 downstream from conveyor 10, is normally set to a first configuration arresting opening devices 3 along path A, and is movable into a second configuration permitting travel of opening devices 3; and two second conveyors 12 (push means), which travel past unit 11 at predetermined intervals to move unit 11 from the first configuration to the second configuration, so that opening devices 3 travel through unit 11 in sequence and at a predetermined rate.

More specifically, conveyor 10 (FIGS. 2 to 4) receives opening devices 3 from the hopper and from a device (not shown) for arranging opening devices 3 in a line and making them available to conveyor 10.

Conveyor 10 defines a flat surface 20 connected operatively to a motor (not shown) and movable parallel to path A to convey opening devices 3. More specifically, surface 20 conveys the opening devices arranged in a line, and each positioned with a first side—the side eventually projecting from the respective package once the device is glued—contacting surface 20, and with a second side—opposite the first side and eventually glued to the respective package—free.

With particular reference to FIGS. 1 to 5, unit 11 comprises two arms 15 rotating about respective axes B, C parallel to each other and extending perpendicular to path A. Each arm 15 can be set to a first angular position, in which it cooperates with a respective opening device 3 to arrest opening device 3 along path A and prevent it being fed through unit 11, and a second angular position, in which it is detached from respective opening device 3 to allow it through unit 11 and along path A.

More specifically, arms 15 are arc-shaped to cooperate with an end portion of opening devices 3.

Unit 11 also comprises a spring 16 (FIGS. 1 and 5) for elastically loading arms 15 into the first angular position; and a lever mechanism 17 (FIG. 5) connecting a cylinder 30, supporting spring 16, operatively to arms 15.

Figure 5:
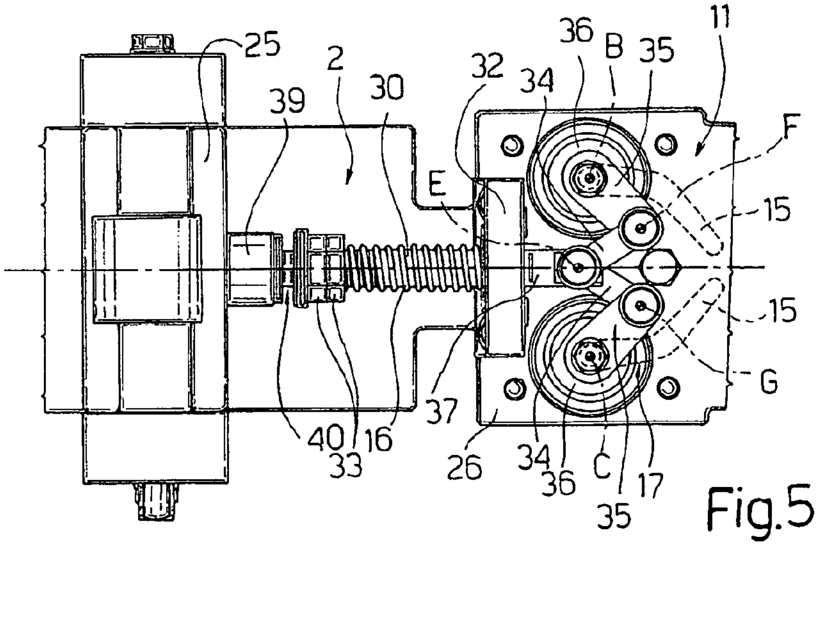
FIG. 5 shows a top plan view, with parts removed for clarity, of the FIG. 1 sequencing unit.

With particular reference to FIG. 5, cylinder 30 has an axis extending parallel to path A; a first axial end 37 connected to lever mechanism 17; and a second axial end (not shown in FIG. 5) opposite end 37 and which slides inside a fixed structure 2 of unit 1. More specifically, the second end of cylinder 30 is screwed to a nut 33 surrounding the second end.

An intermediate portion of cylinder 30 is housed in sliding manner inside a projection 32 fixed to a portion 26 of structure 2.

Spring 16 is a helical spring, extends parallel to path A, and is wound coaxially on cylinder 30. More specifically, spring 16 is interposed between projection 32 and nut 33 (adjustment means) surrounding cylinder 30 coaxially.

When subjected to external force, cylinder 30 slides in a first direction parallel to path A, so as to move nut 33 towards projection 32 and compress spring 16; and when the external force is removed, spring 16 expands to slide cylinder 30 in a second direction opposite the first, and so move nut 33 away from projection 32.

By means of cylinder 30 and projection 32, lever mechanism 17 converts expansion/contraction of spring 16 into rotation of arms 15 about respective axes B, C.

More specifically, lever mechanism 17 converts rotation, by opening devices 3, of each arm 15 from the first to the second angular position into contraction of spring 16 from a least-compressed position of spring 16; and converts expansion of spring 16, from a fully-compressed position of the spring, into rotation of each arm 15 from the second to the first angular position.

Lever mechanism 17 comprises a first pair of levers 34, each hinged to end 37 of cylinder 30; and a second pair of levers 35, each connecting a respective arm 15 to a respective lever 34.

More specifically, both levers 34 are hinged to end 37 of the cylinder about an axis E perpendicular to path A and parallel to axes B, C.

Levers 35 have respective first ends hinged to respective levers 34 about respective axes F, G parallel to axis E; and respective second ends integral with respective arms 15.

More specifically, the second end of each lever 35 is connected to respective arm 15 by a respective pin 36 positioned vertically in use and fixed at opposite ends to respective arm 15 and respective lever 35.

The position of nut 33 is adjustable selectively from the outside to adjust the preload of spring 16 and therefore elastic loading of arms 15 into the first angular position. More specifically, turning nut 33 on cylinder 30 in a first direction stretches spring 16 to reduce the preload; and conversely, turning nut 33 on cylinder 30 in the opposite direction further compresses spring 16 to increase the preload.

Unit 11 also comprises a nut 40 (second adjusting means) coaxially surrounding cylinder 30, and which can be screwed on cylinder 30 to translate cylinder 30 parallel to path A.

More specifically, nut 40 is located in an intermediate position between nut 33 and a portion 25 of structure 2 separate from portion 26, and has one end cooperating with nut 33.

Screwing/unscrewing nut 40 on cylinder 30 adjusts the position of end 37 of cylinder 30, and therefore the angle between a fixed direction integral with each arm 15 and path A, when arm 15 is in the first angular position.

Nut 40 is integral with a damper 39 (damping means) preferably made of elastomeric material and for damping vibration of unit 11 and so reducing the operating noise level and prolonging the working life of unit 11.

More specifically, damper 39 is interposed between portion 25 and nut 40.

Conveyors 12 cooperate at predetermined intervals with opening devices 3 to push opening devices 3 against unit 11 and to move arms 15 from the first to the second angular position and so compress spring 16 from the least-compressed position.

Conveyors 12 continue cooperating with opening devices 3, even after opening devices 3 are fed through unit 11, to push them along path A to the units downstream from unit 1.

Each conveyor 12 is located on a respective side of path A, and comprises an endless toothed belt 41 (only shown partly in FIGS. 2 to 4) driven by a motor not shown; and a number of paddles 42 projecting from belt 41, outwards of the loop defined by the belt.

As belts 41 operate, paddles 42 of each belt 41 travel along an endless path comprising a first portion 43 converging with respect to path A, and a second portion 44 parallel to path A.

More specifically, along portion 43 (FIGS. 2 and 3), paddles 42 of each belt 41 approach and impact the opening device 3 retained by unit 11, and, along portion 44, guide opening devices 3 downstream from unit 11.

Each paddle 42 is substantially L-shaped, with a short leg fixed to respective belt 41, and a long leg interacting with opening devices 3.

Unit 1 also comprises a further stop unit 45 (further stop means) for arresting opening devices 3 upstream from unit 11 along path A, when package supply to the units downstream from unit 1 is temporarily cut off.

Unit 45 comprises two L-shaped members 46 located on opposite sides of opening devices 3, and which do not interfere with opening devices 3 in normal operating conditions.

Members 46 are selectively movable towards each other in a direction perpendicular to path A to interfere with and arrest opening devices 3 before they reach unit 11.

In actual use, opening devices 3 are conveyed in a line by conveyor 10, each positioned with the side for gluing to the respective package facing away from surface 20.

Opening devices 3 carried on conveyor 10 are arrested by unit 11, which is normally set to the first configuration. More specifically, arms 15 of unit 11 are set to the first angular position to arrest opening devices 3 along path A; and spring 16 is in the least-compressed position.

Conveyors 12 interact cyclically with each opening device 3 (FIGS. 2 and 3) arrested by arms 15, so as to first move arms 15 into the second angular position, thus compressing spring 16, and then feed opening devices 3 (FIG. 4) downstream from unit 11 in sequence and at a predetermined rate.

More specifically, each opening device 3 is pushed against arms 15 by a respective pair of paddles 42, each moved by a relative belt 41 along relative portion 43.

The force exerted by each opening device 3 on arms 15 moves arms 15 from the first to the second angular position.

As arms 15 move from the first to the second angular position, lever mechanism 17 withdraws cylinder 30 away from portion 25, thus contracting spring 16 from the least—to the fully-compressed position.

Once the force exerted by opening device 3 on arms 15 is removed, spring 16 expands, thus translating cylinder 30 towards portion 25 and restoring arms 15 from the second to the first angular position by means of lever mechanism 17.

At this point, paddles 42 travel along portions 44, and continue cooperating with respective opening device 3 to push it downstream from unit 11 along path A to the units downstream from unit 1.

By activating unit 45 so that members 46 interact with opening devices 3, supply of opening devices 3 to unit 11 can be cut off in the event package supply to the units downstream from unit 11 is temporarily cut off. During operation of unit 1, the elastic load on arms 15 can be adjusted by screwing nut 33 on cylinder 30.

During operation of unit 1, the angle between each fixed direction integral with respective arm 15 and path A can also be adjusted by screwing/unscrewing nut 40 on cylinder 30.

The advantages of unit 1 according to the present invention will be clear from the foregoing description.

In particular, unit 1 provides for feeding opening devices 3 in sequence and at a predetermined rate to the units downstream from unit 1, in particular to the adhesive application unit and the gluing unit.

Unit 1 is extremely flexible, by being able to feed opening devices 3 along path A at different rates. The feed rate of opening devices 3, in fact, can be adjusted easily by adjusting the travelling speed of conveyors 12 and, therefore, the rate at which paddles 42 interact with opening devices 3.

Unit 1 is also extremely flexible by enabling adjustment of the elastic load on the arms by means of nut 33, and adjustment by means of nut 40 of the angle between each fixed direction integral with respective arm 15 and path A.

Featuring only one spring 16, unit 1 provides for accurately synchronizing the movements of arms 15 and so preventing malfunctioning of unit 1.

Moreover, employing only one spring 16 provides for easily synchronizing adjustment of the elastic loads on both arms 15, and of both the angles between the fixed directions integral with relative arms 15 and path A.

The above adjustments are made particularly easy by simply involving the use of nuts 33 and 40 respectively.

Unit 1 also has a particularly long working life, by virtue of damper 39 damping operating vibration and so reducing stress and wear of the mechanical components of unit 1.

Damper 39 is also highly effective in reducing the noise level of unit 1, especially as regards movement of unit 11 between the first and second configuration.

By means of unit 45, unit 1 provides for cutting off supply of opening devices 3 downstream from unit 11 without stopping unit 1, in the event package supply to the units downstream from unit 1 is temporary cut off.

Clearly, changes may be made to unit 1 without, however, departing from the protective scope as defined in the accompanying Claims.

In particular, spring 16 may be released when unit 11 is in the first configuration and arms 15 in the first angular position.

The invention claimed is:

1. A sequencing unit operating along a feed path of a number of opening devices for attachment to respective sealed packages of pourable food products, comprising:

conveying means for conveying said opening devices arranged in at least one line;

releasable stop means interacting with said opening devices downstream from said conveying means along said path to stop movement of the opening devices and thereby prevent travel of the opening device along the path while the stop means is in a first configuration; said stop means normally being set to the first configuration, and being movable into a second configuration allowing travel of said opening devices along said path; and push means comprised of a pair of paddles positioned on opposite sides of the path and traveling at predetermined intervals past said stop means so that both paddles engage one of the opening devices stopped by said stop means and move said one opening device along the path so that the movement of said one opening device by the paddles pushes said one opening device against the stop means which applies a force to said stop means moving said stop means from said first configuration to said second configuration, so that said opening devices are fed in sequence and at a predetermined rate through the stop means, the stop means stopping movement of the opening devices before the opening devices are engaged by the push means.

2. A unit as claimed in claim 1, wherein said releasable stop means comprises two arms which rotate about spaced apart axes, each of the arms being connected to an elongated member, and further comprising a single spring encircling the elongated member, the single spring applying a biasing force to both of the arms urging the arms to be normally positioned in the movement path to stop movement of the forwardmost one of the opening devices, the single spring being compressed when the arms are moved out of the movement path to permit the forwardmost opening device to move in the forward direction.

3. A unit as claimed in claim 2, wherein said push means continue cooperating with said opening devices downstream from said stop means along said path, so as to convey the feed devices in sequence and at said predetermined rate.

4. A unit as claimed in claim 2, wherein said stop means are loaded elastically into said first configuration by a single spring encircling a cylinder, the cylinder having one end connected to the stop means by a plurality of levers.

5. A unit as claimed in claim 2, comprising further stop means which interact selectively with said opening devices to prevent said opening devices from moving along said path before said opening devices reach said stop means.

6. A unit as claimed in claim 1, wherein said push means continue cooperating with said opening devices downstream from said stop means along said path, so as to convey the feed devices in sequence and at said predetermined rate.

7. A unit as claimed in claim 1, wherein said stop means are loaded elastically into said first configuration by a single spring encircling a cylinder, the cylinder having one end connected to the stop means by a plurality of levers.

8. A unit as claimed in claim 4, comprising adjustment means for adjusting the elastic load on said stop means.

9. A unit as claimed in claim 1, comprising one spring which interacts with said stop means to move them from one of said first and second configurations to the other of said first and second configurations.

10. A unit as claimed in claim 9, wherein said stop means comprise two arms connected operatively to said spring; each said arm being loaded by said spring into a first position in which it interacts with said opening devices along said path, and being movable by said opening device, and in opposition to said spring, into a second position detached from said opening devices.

11. A unit as claimed in claim 10, comprising second adjusting means operated selectively to adjust positioning of the two arms in the first position.

12. A unit as claimed in claim 11, comprising damping means integral with said second adjusting means and for reducing the noise level of the unit.

13. A unit as claimed in claim 12, wherein said damping means are made of elastically deformable material.

14. A unit as claimed in claim 13, comprising further stop means which interact selectively with said opening devices to prevent said opening devices from moving along said path before said opening devices reach said stop means.

15. A unit as claimed in claim 1, comprising further stop means which interact selectively with said opening devices to prevent said opening devices from moving along said path before said opening devices reach said stop means.

16. A sequencing unit operating along a feed path of a number of opening devices for attachment to respective sealed packages of pourable food products, comprising:

a first conveyor movable to convey the opening devices arranged in at least one line in a forward direction along a movement path;

a pair of arms both normally positioned in the movement path to stop movement of a forwardmost one of the opening devices downstream from the conveyor, the pair of arms being movable out of the movement path to permit the forwardmost opening device to move in the forward direction; and two movable second conveyors each provided with a plurality of respective paddles that move together with the respective second conveyor, the second conveyors being positioned relative to the pair of arms to move one of the paddles of each second conveyor into contact with the forwardmost opening device stopped by the pair of arms to apply a force moving the forwardmost opening device in the forward direction along the movement path so that the moving forwardmost opening device applies a force to the pair of arms which moves the pair of arms out of the movement path, with each successive one of the opening devices being fed in sequence and at a predetermined rate to push the pair of arms out of the movement path.

17. A unit as claimed in claim 16, wherein each of the arms is connected to an elongated member, and further comprising only a single spring encircling the elongated member, the single spring applying a biasing force to both of the arms urging the arms to be normally positioned in the movement path to stop movement of the forwardmost one of the opening devices, the single spring being compressed when the arms are moved out of the movement path to permit the forwardmost opening device to move in the forward direction.

18. A unit as claimed in claim 17, further comprising a pair of L-shaped members positioned on opposite sides of the movement path at a position upstream of the arms, the L-shaped members being selectively movable towards each other to move to a position where the two L-shaped members interfere with and stop movement of the opening devices moving along the movement path before reaching the arms.

19. A unit as claimed in claim 17, wherein the single spring is positioned between a projection on the elongated member and an adjustable nut on the elongated member, the adjustable nut being movable along the elongated member to adjust a preload of the spring by either compressing the spring more or compressing the spring less.

20. A unit as claimed in claim 19, further comprising an additional nut threadably engaging the elongated member and selectively adjustable to vary an angle each of the arms makes with the movement path when the two arms are normally positioned in the movement path to stop movement of the forwardmost of the opening devices.

* * * * *